US012601391B2

(12) United States Patent
Cora et al.

(10) Patent No.: US 12,601,391 B2
(45) Date of Patent: Apr. 14, 2026

(54) LOGARITHMIC HOLLOW SHAFT SPEED REDUCER

(71) Applicants: Sorin Vasile Cora, Orange, CA (US); Judit Ildiko Dan, Orange, CA (US)

(72) Inventors: Sorin Vasile Cora, Orange, CA (US); Judit Ildiko Dan, Orange, CA (US)

( * ) Notice: Subject to any disclaimer, the term of this patent is extended or adjusted under 35 U.S.C. 154(b) by 10 days.

(21) Appl. No.: 18/627,558

(22) Filed: Apr. 5, 2024

(65) Prior Publication Data

US 2025/0314289 A1     Oct. 9, 2025

(51) Int. Cl.
F16H 25/06      (2006.01)
F01C 1/08       (2006.01)
F16H 3/56       (2006.01)

(52) U.S. Cl.
CPC ............. F16H 25/06 (2013.01); F01C 1/084 (2013.01); F16H 3/56 (2013.01); *F16H 2025/063* (2013.01)

(58) Field of Classification Search
CPC .... F16H 1/321; F16H 2001/326; F16H 13/08; F16H 25/06; F16H 2025/063
See application file for complete search history.

(56) References Cited

U.S. PATENT DOCUMENTS

| | | | | | |
|---|---|---|---|---|---|
| 5,016,487 A | * | 5/1991 | Bollmann | ............... | F16H 25/06 74/216.3 |
| 5,286,236 A | * | 2/1994 | Hosokawa | .............. | F16H 25/06 475/168 |
| 5,312,306 A | * | 5/1994 | Folino | ...................... | F16H 25/06 476/36 |
| 5,321,988 A | * | 6/1994 | Folino | ...................... | F16H 25/06 74/25 |
| 5,514,045 A | * | 5/1996 | Folino | ...................... | F16H 25/06 476/36 |
| 5,562,564 A | * | 10/1996 | Folino | ...................... | F16H 25/06 476/36 |
| 5,873,800 A | * | 2/1999 | Maslow | ................... | F16H 25/06 475/5 |
| 6,068,573 A | * | 5/2000 | Folino | ...................... | F16H 25/06 476/36 |
| 6,125,711 A | * | 10/2000 | Bursal | ..................... | F16H 25/06 476/36 |
| 6,270,442 B1 | * | 8/2001 | Folino | ...................... | F16H 25/06 476/36 |
| 8,162,790 B2 | * | 4/2012 | Imase | ...................... | F16H 25/06 475/168 |

(Continued)

FOREIGN PATENT DOCUMENTS

WO     WO-2019151099 A1 *   8/2019

OTHER PUBLICATIONS

WO2019151099 translation (Year: 2019).*

*Primary Examiner* — Timothy Hannon

(57) ABSTRACT

A logarithmic hollow shaft speed reducer comprising a compact, modular two-stage rotary system with independently selectable coupling paths. The first stage produces coaxial outputs directed to either the ring, sun, or carrier of a standalone second-stage differential planetary gear. This architecture enables multiple torque-speed modes—high-speed/low-torque, balanced, and high-torque/low-speed—without altering drive element configuration. The speed reducer's modularity and clarity support cost-effective manufacturing and flexible deployment.

6 Claims, 7 Drawing Sheets

(56)             References Cited

U.S. PATENT DOCUMENTS

| | | | | |
|---|---|---|---|---|
| 10,670,121 B2 * | 6/2020 | Igi | ......................... | F16H 25/06 |
| 2008/0188341 A1 * | 8/2008 | Miao | ..................... | F16H 25/06 |
| | | | | 475/184 |

* cited by examiner

5A

LOGARITHMIC HOLLOW SHAFT SPEED REDUCER

FIELD OF THE INVENTION

The present invention relates to a compact two-stage rotary speed conversion system. More specifically, it incorporates a hollow rotary speed reducer with dual coaxial outputs as a first stage, operatively coupled to a standalone planetary gear set as a second stage. This integrated architecture provides an expanded range of transmission ratios and enhanced functional adaptability relative to conventional rotary speed reducers.

BACKGROUND OF THE INVENTION

Mechanical rotary speed reducers play a vital role in power transmission systems by transferring torque and rotary motion from a power-generating subsystem (e.g., an electric motor) to a load-handling subsystem. Conventional speed reducers typically rely on intermeshing rotary components (such as gears or splines), where the attainable transmission ratio is inherently limited by fixed geometric relationships.

A standalone planetary gear system—comprising a sun gear, planetary carrier, and ring gear—exhibits significant configurational flexibility, as any of the three components can function as the output, driven by the dynamic interplay of the other two. However, conventional implementations often compromise this versatility by statically fixing one component, thereby limiting the input-output configuration.

The embodiments presented hereafter address these limitations through a dual-stage mechanism that integrates a dual coaxial-output rotary speed reducer with a standalone planetary gear assembly. This architecture enables finer control over a broader spectrum of transmission parameters while preserving a compact structural envelope, thus enhancing adaptability across a wide range of operational scenarios.

SUMMARY OF THE INVENTION

The present invention provides a compact, dual-stage rotary speed reducer system designed to enhance both transmission versatility and spatial efficiency. The first stage includes a hollow rotary speed reducer with dual coaxial outputs. The second stage comprises a standalone planetary gear assembly operatively coupled to the first stage, via sets of interconnecting components, enabling customizable output characteristics through selectable input to output routing. This integrated architecture expands the achievable transmission ratio range while maintaining a compact structural footprint, thereby improving adaptability across a wide spectrum of mechanical and electromechanical applications.

BRIEF DESCRIPTION OF THE DRAWINGS

Having thus generally described the nature of the present invention, reference will now be made to the accompanying drawings, which illustrate, by way of example, one preferred embodiment thereof. It should be understood that the drawings are provided for illustrative purposes only and are not intended to limit the scope or spirit of the invention in any way. In the drawings, like reference characters designate corresponding parts in the various views.

DETAILED DESCRIPTION OF THE INVENTION

The terminology used herein is provided for illustrative purposes and is not intended to limit the invention to the particular embodiments described. As used herein, the term "and/or" encompasses any and all combination of one or more of the associated listed items. The singular forms "a", "an", and "the" include the plural referents, unless the context explicitly indicates otherwise. It is further understood that the terms "comprises", and/or "comprising", as used in this specification, denote the presence of stated features, elements and/or components, but do not preclude the inclusion or addition of other features, elements, components, and/or groups thereof.

Unless otherwise specified, all terminology used herein, shall be interpreted according to its ordinary meaning as understood by one skilled in the art relevant to this disclosure. For clarity and conciseness, not every permutation or configuration of the disclosed components is expressly detailed. Nonetheless, such variants, including modular subassemblies, scalable adaptations, and interface-compatible components, are encompassed within the scope of the invention.

This disclosure is illustrative and non-restrictive. Modifications, substitutions, and refinements—whether involving alternative geometries, material selections, dynamic interconnections, or application-specific tailoring—may be implemented without departing from the spirit or scope of the invention as defined by the appended claims.

Referring now to the appended figures, the present invention is described through illustrative embodiments. Fasteners such as bolts and nuts are omitted for clarity.

Figure 1:
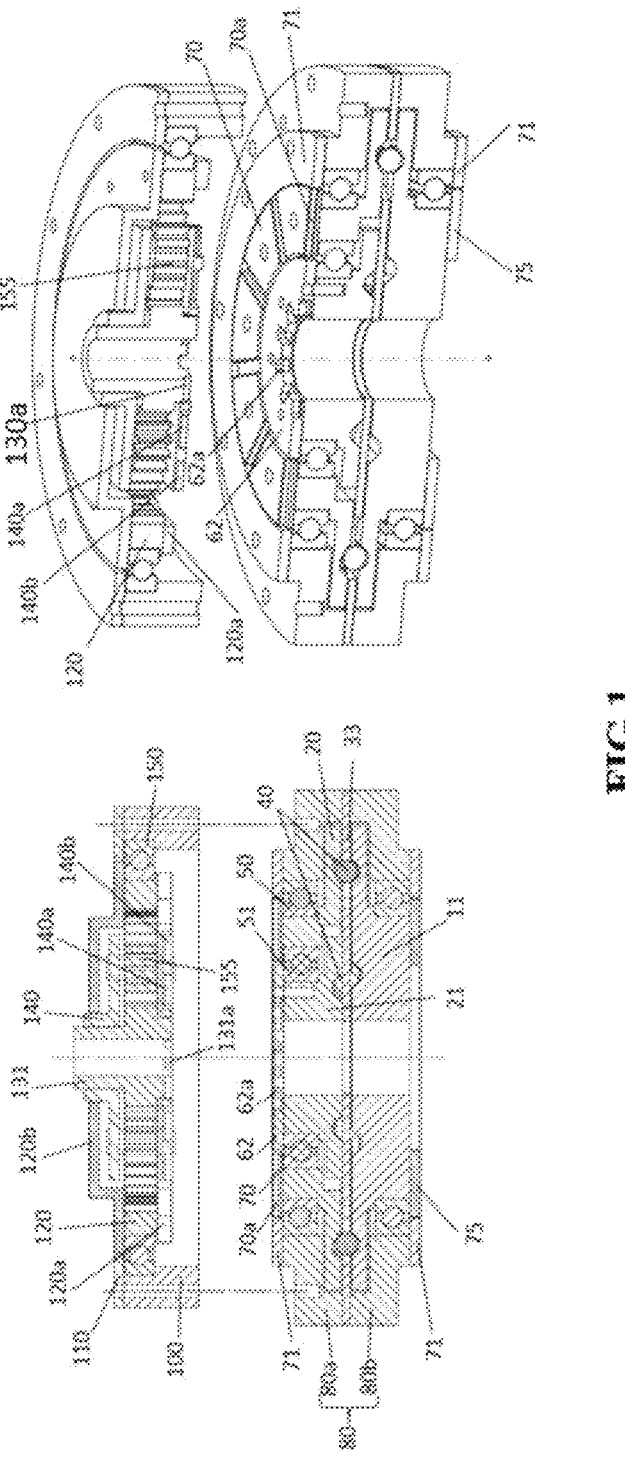
FIG. 1 provides a high-level isometric and exploded cross-sectional view of the speed reducer in accordance with the present invention, illustrating relative positions of the first and second stages. Interlocking components are omitted for clarity.

FIG. 1 illustrates the compact, two-stage rotary speed reducer system in both exploded and isometric cross-sectional views. The first stage includes a logarithmic hollow shaft speed reducer featuring dual coaxial outputs. This stage is operatively coupled to a standalone planetary gear assembly. Mechanical interconnection between the two stages is enabled by a set of spider-like or dowel pins coupling elements (not shown), each designed to maintain coaxial alignment and ensure smooth rotary motion and torque transmission.

Figure 6:
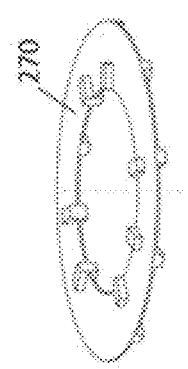
FIG. 6 illustrates the spider-shaped interlocking components (230, 250, 260 and 270), designed to facilitate various coupling modes between stages, in accordance with the embodiment of the present invention.
Figure 6:
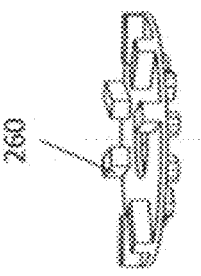
Figure 6:
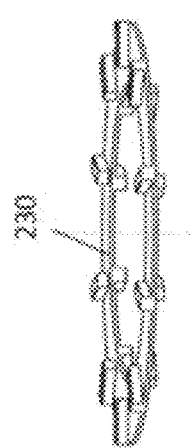
Figure 6:
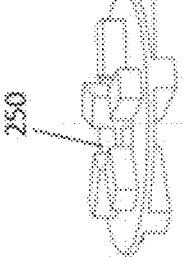
Figure 7:
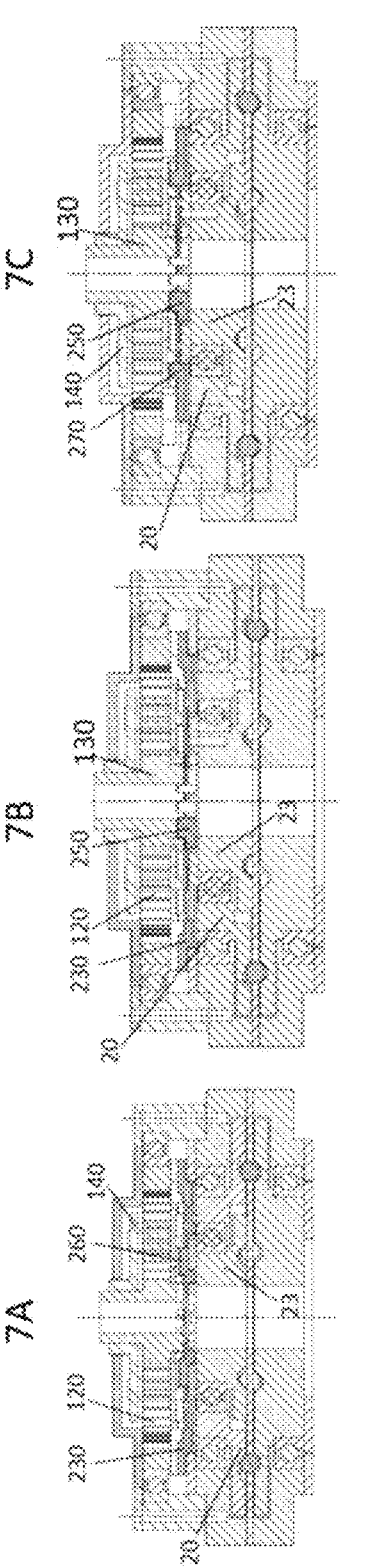
FIG. 7 provides cross-sectional views of three exemplary inter-stage coupling configurations (7A, 7B, and 7C) between the first and second stages, each featuring interlocking components that facilitate mechanical coupling.

FIG. 1 further depicts the spatial arrangement of the two stages, with critical interlocking interfaces of the first stage designated as, (70*a*), and (62*a*), and corresponding interlocking features of the second stage identified as (120*a*), (130*a*), (140*a*), and (140*b*). To facilitate visualization of the mechanical interface architecture, the spider-shaped coupling elements (230), (250), (260) and (270) and (240) are illustrated separately in FIG. 6, while their integration in assembled configurations (7A), (7B) and (7C) is shown in FIG. 7.

Figure 2:
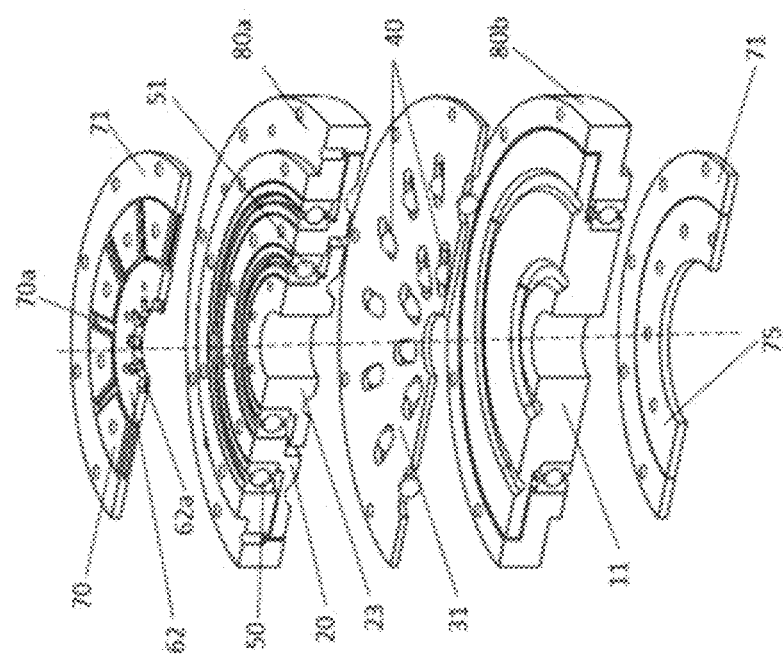
FIG. 2 provides a combined cross-sectional and exploded view of the first stage of the embodiment of the speed reducer, with interlocking components omitted for clarity.
Figure 2:
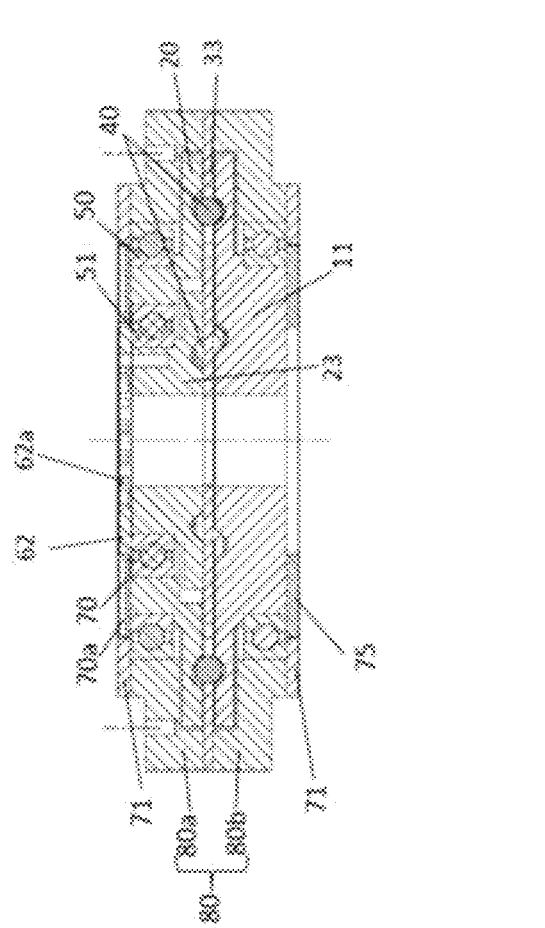

FIG. 2 provides the cross-section and an exploded view of the first stage, which comprises a logarithmic hollow shaft speed reducer. This illustration highlights the relative positions of its primary components including the hollow driver component (11); driven components-outer output (20) and inner output (23); the fixed hollow modulator (33); and bearing balls (40), each seated within corresponding radial slots (35) and (36) of the fixed modulator (33). Positional ball bearings (50) and (51) are also included, with all components coaxially assembled within the outer body (80). The interlocking interface (62*a*) is machined into the top surface of the hollow cover (62), which is bolted to the inner output (23), while the interlocking interface (70*a*) is machined into the top surface of the hollow cover (70), which is secured to the outer output (20) at its top end.

Figure 3:
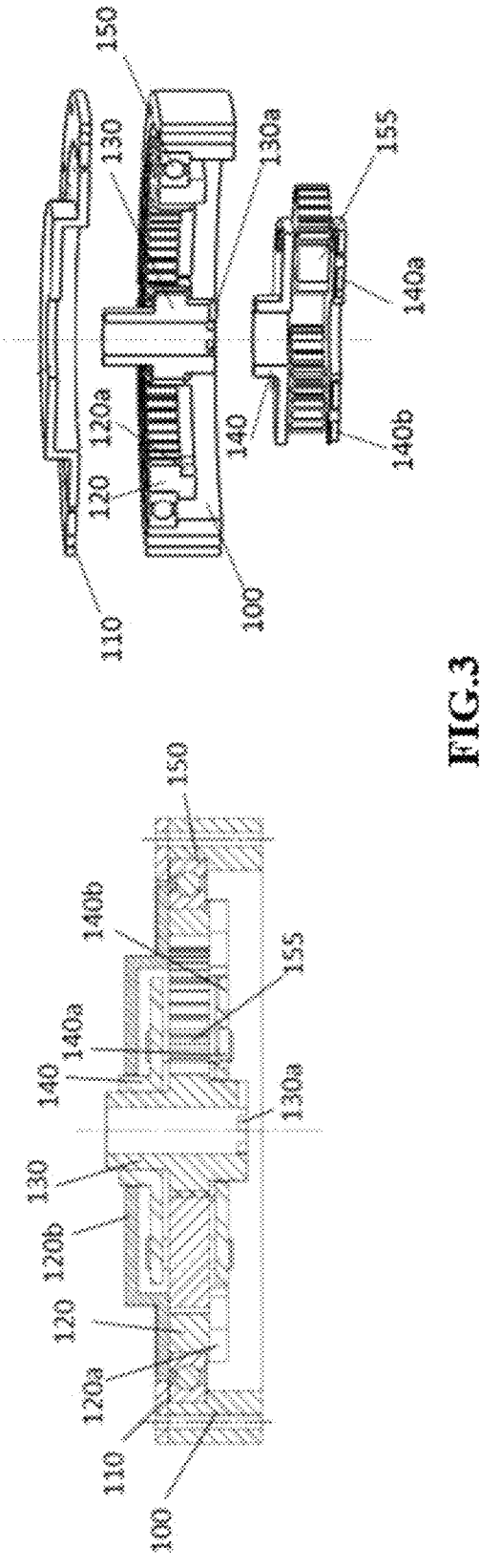
FIG. 3 provides a combined cross-sectional and exploded view of the second stage of the embodiment of the speed reducer, with interlocking components omitted for clarity.
Figure 4:
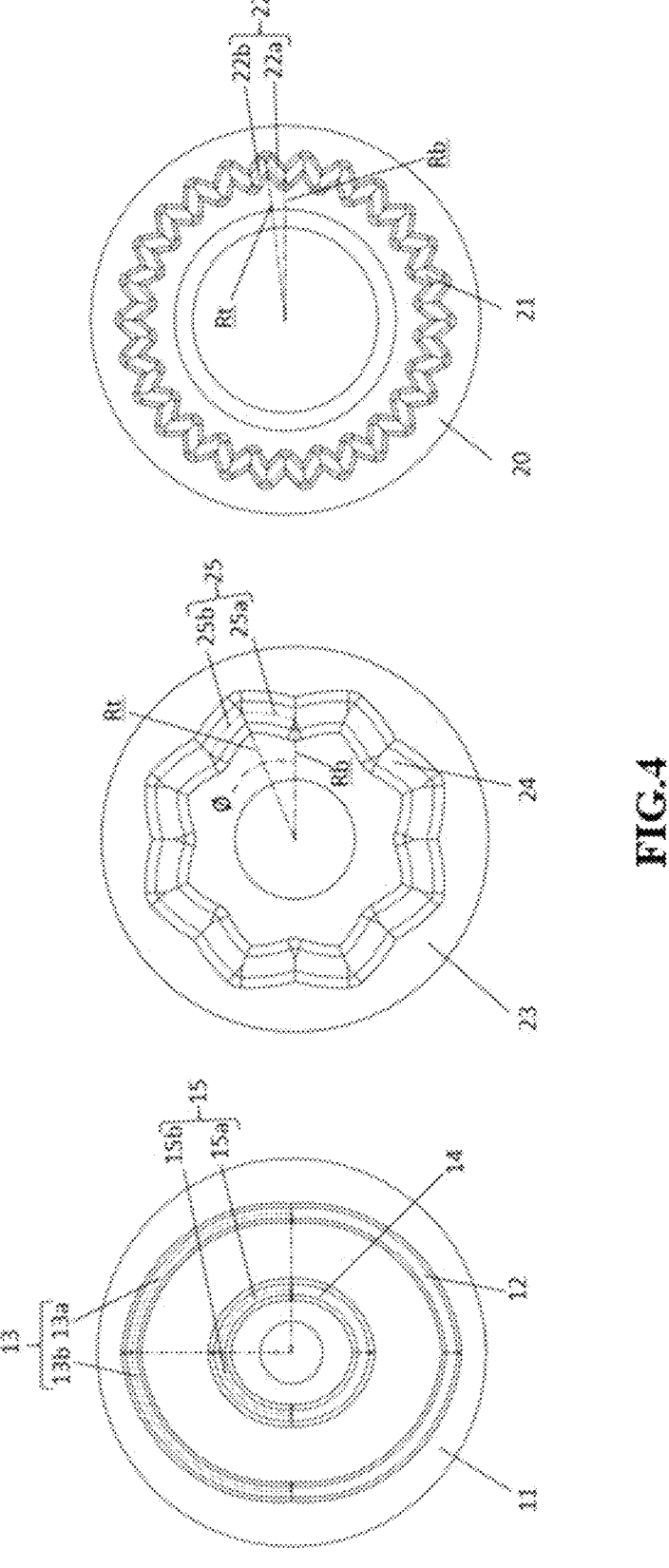
FIG. 4 illustrates the hollow input component (11), including its nested closed input grooves (12) and (14), and hollow output components (20) and (23), each incorporating respective closed output grooves (24) and (21).

FIG. 3 provides the cross-section and an exploded view of the second stage, which comprises a standalone planetary gear system. This illustration highlights the relative positions of its primary components: a ring gear (120) with interlocking interface (120*a*); a planetary carrier (140) with interlocking interfaces (140*a*) and (140*b*), machined on the lower carrier plate; a sun gear (130) with interlocking interface (130*a*); and a body (100), within which all components are coaxially aligned and rotatably mounted via a ball bearing (150).

The curvature and relative angular phasing of the input and output grooves are governed by logarithmic equations:

$$R = R_{b1} * \text{Log}(1 + K_{12} * \emptyset) \text{ for groove (12);}$$

$$R = R_{b1} * \text{Log}(1 + K_{21} * \emptyset) \text{ for groove (21);}$$

$$R = R_{b2} * \text{Log}(1 + K_{14} * \emptyset) \text{ for groove (14);}$$

$$R = R_{b2} * \text{Log}(1 + K_{24} * \emptyset) \text{ for groove (24);}$$

where $R_{b1}$ and $R_{b2}$ are the base radii, ø is the angular position, and $K_{12}$, $K_{21}$, $K_{14}$ and $K_{24}$ are non-dimensional constants associated with their respective grooves. These constants define a first transmission ratio $K_{21}/K_{12}$ for the outer output, and a second transmission ratio $K_{24}/K_{14}$ for the inner output of the first stage. Each transmission ratio may be greater or less than 1.

All bearing balls (40), housed within radial slots (34) of the fixed hollow modulator (33), simultaneously engage both the closed input groove (12) and the closed output groove (21). As the driver component (11) rotates, the profile of the input groove (12) induces radial displacement of the bearing balls along the slots (34), driving them inward or outward. This motion brings the balls into engagement with the output groove (21), thereby transmitting torque and rotary motion to it—and subsequently to the driven component (20)—in accordance with the instantaneous radial position of each bearing ball, as governed by the rotating input groove (12).

Similarly, bearing balls (40), housed within radial slots (35) of the same fixed hollow modulator (33), engage the closed input groove (14) and closed output groove (24). Rotation of the driver component (11) causes the profile of input groove (14) to induce radial displacement of each ball along its respective slot (35), again driving it inward or outward. This displacement brings each ball into engagement with the output groove (24), transmitting torque and rotary motion to it, and subsequently to the driven component (23), in accordance with the instantaneous radial position dictated by the rotating input groove (14).

Figure 5:
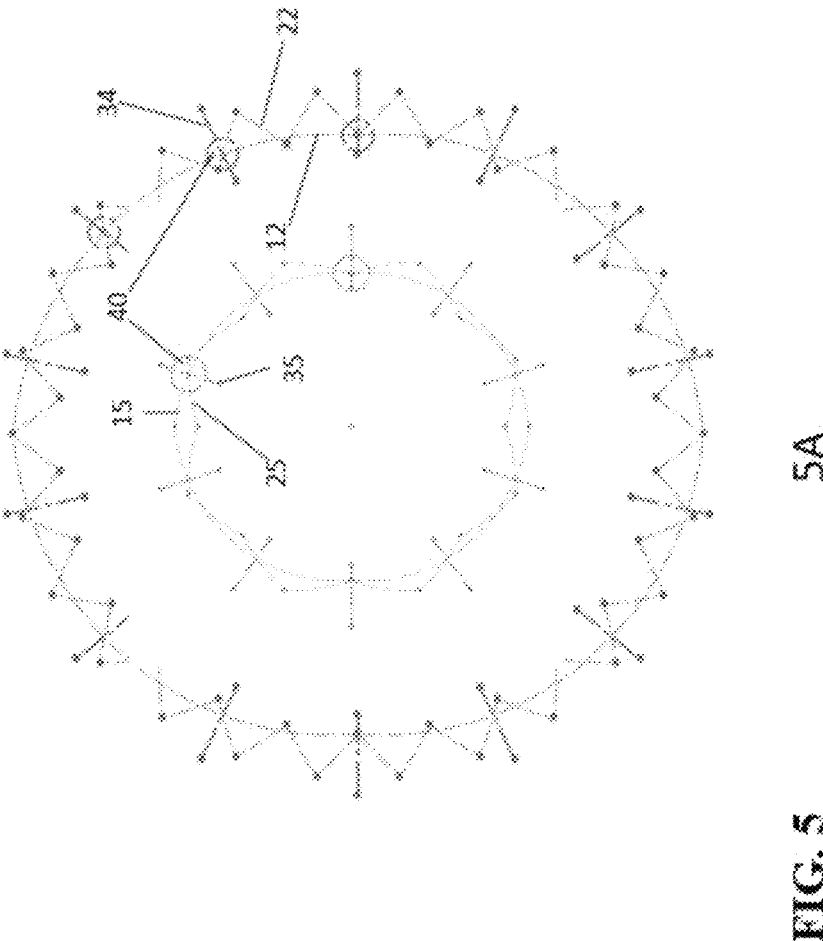
FIG. 5 depicts the hollow fixed modulator (33), including its centrally arranged circular arrays of nested radial slots (34) and (35) and attachment holes (36), and includes diagram 5A, illustrating the geometric conditions required for smooth operation of the first stage of the speed reducer.
Figure 5:
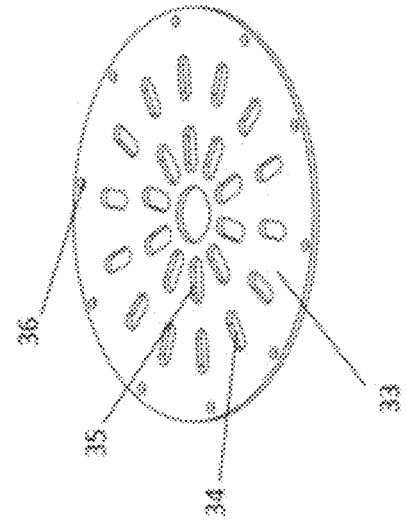

Smooth torque and rotary motion transmission is feasible only when, at any given instant, there is precise and simultaneous co-alignment of all interacting components—namely, the closed grooves, radial slots, and bearing balls—as shown in diagram 5A of FIG. 5.

The fully integrated configurations (7A, 7B, and 7C) of the speed reducer of the present invention are illustrated in FIG. 7

In configuration 7A, the outer output (20) of the first stage is coupled via coupling component (230) to the ring gear (120) of the second stage, while the inner output (23) is connected through coupling element (260) to the planetary carrier 140 of the second stage. In this arrangement, the sun gear functions as the system's final output. This configuration delivers a high-speed, low-torque output, with the final output rotating in the same direction as the ring gear and planetary carrier inputs. It is particularly well-suited for applications emphasizing rapid actuation or rotational responsiveness.

In configuration 7B, the planetary carrier serves as the system's final output. The first stage's outer output (20) remains connected to the ring gear (120) of the second stage via coupling component (230), while the inner output (23) is connected to the sun gear (130) via coupling component (250). This arrangement yields a moderate output speed and torque, with the final output rotation typically aligning with the net rotational bias of the first stage. It offers a balanced trade-off between torque capacity and response time, beneficial for load-adaptive mechanisms.

In configuration 7C, the ring gear serves as the final output. The first stage's inner output (23) is connected to the sun gear (130) of the second stage via coupling component (250), while the outer output (20) is coupled to the planetary carrier (140) via coupling component (270). This configuration provides a high-torque, low-speed output, with the final output typically rotating in the opposite direction of the sun gear drive. It is ideal for torque-intensive applications such as lifting, indexing, or force amplification systems.

The invention claimed is:

1. A two-stage hybrid speed reducer consisting of:

as a first stage:

a dual coaxial-output speed reducer consisting of:

a rotatable hollow input driver component configured to rotate about a central axis, said input having two concentrically nested closed input grooves machined on one of its sides, each of said input grooves being a centered circular array of multiple identical input lobes, and each of said input lobes being formed by two symmetric arches in respect to the radius passing through the tip of the ascending arch;

two coaxially rotatable hollow output driven components configured to rotate about said central axis in the same or opposite directions to each other, each of said output driven components having its own closed output groove machined on its flat side, said closed output groove being a centered circular array of identical output lobes, the number of said output lobes of first output components being different from the number of said output lobes of second output components, each of said output lobes being formed by two symmetric arches in respect to the radius passing through the tip of the ascending arch;

a fixed modulator disc positioned between said input and the two coaxial outputs, said modulator having a first circular array of radial slots for the first output centered about said central axis, and a second coaxially nested circular array of radial slots centered about said central axis for the second output, and a circular array of attaching holes also centered about said central axis;

bearing balls to transfer torque and motion from said input to both coaxial outputs, said bearing balls being located in-between the closed grooves of said input and the closed groove of each said coaxial outputs, and moving along the slots of said modulator when said input rotates;

an axially symmetric body configured to allow for coaxial fixation of said fixed modulator, with said closed input and output grooves facing each other;

as a second stage:

a standalone differential planetary gear set on top of the first stage having a planetary ring driven by the outer output of the first stage and a sun gear driven by the inner output of the first stage.

2. A two-stage hybrid speed reducer consisting of:

as a first stage:

a dual coaxial-output speed reducer consisting of:

a rotatable hollow input driver component configured to rotate about a central axis, said input having two concentrically nested closed input grooves machined on one of its sides, each of said input grooves being a centered circular array of multiple identical input lobes, and each of said input lobes being formed by two symmetric arches in respect to the radius passing through the tip of the ascending arch;

two coaxially rotatable hollow output driven components configured to rotate about said central axis in the same or opposite directions to each other, each of said output driven components having its own closed output groove machined on its flat side, said closed output groove being a centered circular array of identical output lobes, the number of said output lobes of first output components being different from the number of said output lobes of second output components, each of said output lobes being formed by two symmetric arches in respect to the radius passing through the tip of the ascending arch;

a fixed modulator disc positioned between said input and the two coaxial outputs, said modulator having a first circular array of radial slots for the first output centered about said central axis, and a second coaxially nested circular array of radial slots centered about said central axis for the second output, and a circular array of attaching holes also centered about said central axis;

bearing balls to transfer torque and motion from said input to both coaxial outputs, said bearing balls being located in-between the closed grooves of said input and the closed groove of each said coaxial outputs, and moving along the slots of said modulator when said input rotates;

an axially symmetric body configured to allow for coaxial fixation of said fixed modulator, with said closed input and output grooves facing each other;

as a second stage:

a standalone differential planetary gear set on top of the first stage having a planetary ring driven by the outer output of the first stage and a satellite carrier driven by the inner output of the first stage.

3. A two-stage hybrid speed reducer consisting of:

as a first stage:

a dual coaxial-output speed reducer consisting of:

a rotatable hollow input driver component configured to rotate about a central axis, said input having two concentrically nested closed input grooves machined on one of its sides, each of said input grooves being a centered circular array of multiple identical input lobes, and each of said input lobes being formed by two symmetric arches in respect to the radius passing through the tip of the ascending arch;

two coaxially rotatable hollow output driven components configured to rotate about said central axis in the same or opposite directions to each other, each of said output driven components having its own closed output groove machined on its flat side, said closed output groove being a centered circular array of identical output lobes, the number of said output lobes of first output components being different from the number of said output lobes of second output components, each of said output lobes being formed by two symmetric arches in respect to the radius passing through the tip of the ascending arch;

a fixed modulator disc positioned between said input and the two coaxial outputs, said modulator having a first circular array of radial slots for the first output centered about said central axis, and a second coaxially nested circular array of radial slots centered about said central axis for the second output, and a circular array of attaching holes also centered about said central axis;

bearing balls to transfer torque and motion from said input to both coaxial outputs, said bearing balls being located in-between the closed grooves of said input and the closed groove of each said coaxial outputs, and moving along the slots of said modulator when said input rotates;

an axially symmetric body configured to allow for coaxial fixation of said fixed modulator, with said closed input and output grooves facing each other;

as a second stage:

a standalone differential planetary gear set on top of the first stage having a satellite carrier driven by the outer output of the first stage and a sun gear driven by the inner output of the first stage.

4. The speed reducer as in any of claims 1-3 wherein the input groove centerline is defined by the linear function $F(\phi)=Rb\cdot(1+K_1\cdot\phi)$, and the output groove centerline is defined by the linear $F(\phi)=Rb\cdot(1+K_2\cdot\phi)$, where Rb denotes a radius at an innermost point of the centerline, $\phi$ is a subtended angle, and $K_1$ and $K_2$ are real numbers with the ratio $K_2/K_1$ defining the transmission ratio of the reducer.

5. The speed reducer as in any of claims 1-3 wherein the input groove centerline is defined by the exponential function $F(\phi)=Rb\cdot A^{\wedge}(K_1\cdot\phi)$, and the output groove centerline is defined by the exponential function $F(\phi)=Rb\cdot A^{\wedge}(K_2\cdot\phi)$, where Rb denotes a radius at an innermost point of the centerline, A is a real number, $\phi$ is a subtended angle, and $K_1$ and $K_2$ are real numbers with the ratio $K_2/K_1$ defining the transmission ratio of the reducer.

6. The speed reducer as in any of claims 1-3 wherein the input groove centerline is defined by the logarithmic function $F(\phi)=Rb \cdot \log(10+K_1 \cdot \phi)$, and the output groove centerline is defined by the logarithmic function $F(\phi)=Rb \cdot \log(10+K_2 \cdot \phi)$, where Rb denotes a radius at an innermost point of the centerline, $\phi$ is a subtended angle, and $K_1$ and $K_2$ are real numbers with the ratio $K_2/K_1$ defining the transmission ratio of the reducer.

\* \* \* \* \*